R. W. SMITH.
COMBINED MUDGUARD AND CARRIER MEMBER FOR USE ON MOTOR AND OTHER CYCLES.
APPLICATION FILED JUNE 30, 1920.
1,398,448.
Patented Nov. 29, 1921.
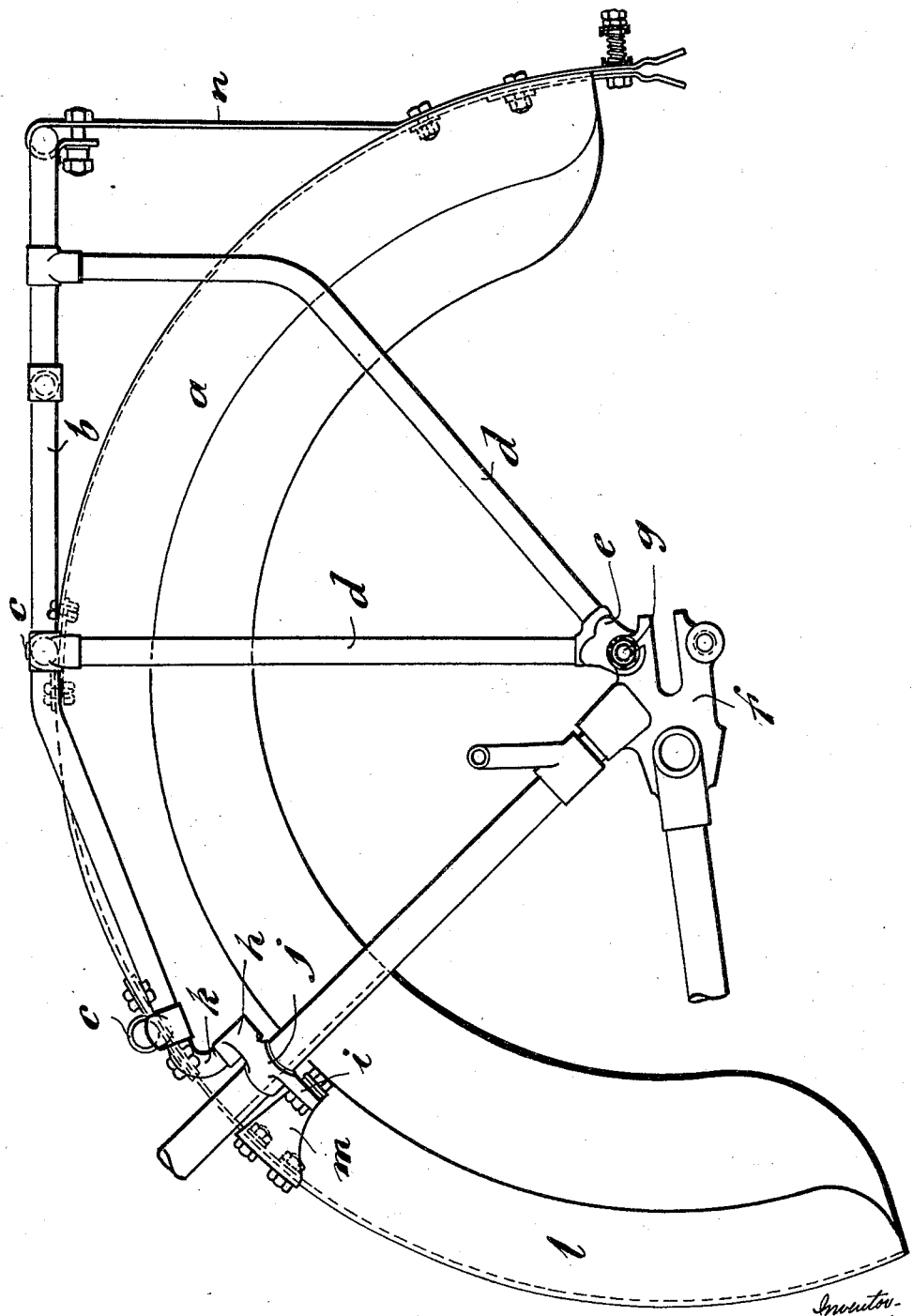

UNITED STATES PATENT OFFICE.

ROBERT WALKER SMITH, OF REDDITCH, ENGLAND, ASSIGNOR OF ONE-HALF TO THE ENFIELD CYCLE COMPANY, LIMITED, OF REDDITCH, WORCESTER, ENGLAND.

COMBINED MUDGUARD AND CARRIER MEMBER FOR USE ON MOTOR AND OTHER CYCLES.

1,398,448. Specification of Letters Patent. Patented Nov. 29, 1921.

Application filed June 30, 1920. Serial No. 393,160.

(GRANTED UNDER THE PROVISIONS OF THE ACT OF MARCH 3, 1921, 41 STAT. L., 1313.)

*To all whom it may concern:*

Be it known that I, ROBERT WALKER SMITH, a citizen of the Kingdom of Great Britain, residing at Enfield Works, Redditch, in the county of Worcester, England, have invented a New or Improved Combined Mudguard and Carrier Member for Use on Motor and other Cycles, (for which I have filed applications in France, Patent No. 512,465, dated March 27, 1920; Switzerland, Patent No. 87,870, dated April 1, 1920; Japan, Patent No. 38,943, dated June 16, 1921; Spain, Patent No. 73,889, dated September 1, 1920; Portugal, Patent No. 11,542, dated April 26, 1921 and Canada, Patent No. 209,566 dated March 15, 1921,) of which the following is a specification.

This invention has relation to the mudguards of motor and other cycles, and to the carrier members such as goods-carriers, passenger seats, or the like, such as are usually positioned over the mudguard and the wheel of the cycle.

The present invention comprises the hereinafter described and illustrated combined mudguard and carrier member, such as a goods carrier, passenger seat, or the like, adapted to be detachably connected to a cycle frame, said combined mudguard and carrier member having projections adapted to be engaged with sockets carried by the saddle stays, and the lower ends of the supporting struts of which combined mudguard and carrier member are provided with slots adapted to be engaged with projections provided upon the cycle frame.

In order that this invention may be clearly understood and readily carried into practice, reference may be had to the appended drawing, which illustrates in side elevation a rear part of the frame of a motor cycle with the present invention applied thereto.

The mudguard $a$ extending out to the rear of the rear fork of the cycle frame is secured to the carrier or seat member $b$, which latter may be of any desired formation, advantageously in the form of an elongated or rectangular frame of tubular or circular sectioned rods having lateral or transverse members extending from one side to the other at suitable intervals in the length of the carrier. The means of securing the mudguard to the carrier may conveniently consist of small metallic strap or clip members $c$ which embrace and grip two or more of the transverse portions of the carrier and are secured by studs or bolts to the mudguard.

Extending downwardly from each of the longitudinal side members of the carrier are a plurality of stays $d$, conveniently two in number, the one stay extending vertically downward while the other stay is connected to the carrier at a position toward the rear extremity of same and extends downwardly and forwardly, the two stays $d$ being connected together at their lower extremities by a common element $e$ which is flattened at its lower part and furnished with a slot opening out at one side edge so as to constitute a hook-like member.

The rear horizontal fork of the cycle frame and the oblique stays or fork-like member extending from the rear wheel axle to the saddle pillar are of the usual construction terminating at their meeting ends in a connecting member $f$ at each side of the wheel, said member being itself of forked or bifurcated formation, the slot in same fitting on the wheel spindle.

On the upper part of this bifurcated bracket is a projecting lug, pin or the like $g$ upon which fits the hook-like termination of the mudguard and carrier supporting stays. This projection or pin $g$ is positioned on the upper arm of the bifurcated bracket member at a suitable distance to the rear of the position, at which the oblique stays or fork of the cycle frame are connected to said bracket.

Securely connected to and projecting out at the rear of each of the oblique stays or fork arms of the cycle frame on each side at or near the upper part of the mudguard is a lug $h$ in the nature of a socket or sleeve member, while a second lug $i$ of flat or substantially flat formation having a perforation therein projects out in a forward or opposite direction to the socket member $h$, the two lugs being connected to the oblique frame stay members by a portion $j$ surrounding each stay, and securely connected thereto as for instance by brazing.

The fore extremities $k$ of the longitudinal side members of the carrier are bent to project downwardly, the end parts being reduced in diameter, so as to fit within the socket member $h$ fixed to the oblique stays of the cycle frame, the shoulder formed by the reduced portion of the hooks bearing on the upper edge of the socket.

That part $l$ of the mudguard extending over the front portion of the wheel at the front of the oblique stays of the frame is advantageously separate from the rear or main portion of the mudguard and is supported in position by a curved plate like portion $m$ secured by bolts, screws or the like to the mudguard and having outward extremities perforated for receiving small bolt members which pass through same and the projecting lugs $i$ upon the oblique stays of the cycle frame.

To fix the mudguard with carrier in position the hook-like members at the lower terminations of the mudguard and carrier supporting stays are caused to engage with the projecting lugs $g$ provided therefor, and the fore extremities $k$ of the carrier are caused to fit into the sockets $h$ and when in position a suitable nut is screwed on to the projection $g$ so as to securely fix the carrier and mudguard in position.

The elongated slot in the hook like element $e$ at the lower ends of the supporting stays is alined with the axis of the upper socket member $h$ receiving the fore ends of the carrier, and by this arrangement all that is necessary to displace the mudguard and carrier is to loosen the nut on the element $g$ and raise the carrier and mudguard in the direction of the center line of the slot in the hook-like element $e$ and the axis of the upper socket $h$.

When it is desired to remove the front portion $l$ of the mudguard also, the small fixing bolts which connect the member with the members $i$ are unscrewed.

A flat strip or other suitable member $n$ may if desired be secured at the rear of the carrier and pass vertically downward therefrom and be connected to the rear part of the mudguard.

The rear portion of the carrier extending from the central vertical stay may be horizontally disposed, while the front portion may be inclined downwardly to the forward end.

What I claim as my invention, and desire to secure by Letters Patent is:—

In combination with a cycle frame having oblique stays and bearing members for a rear wheel, a mudguard, supporting members attached to said stays and having forwardly and rearwardly extending lugs, said last named lugs having sockets, and to the forwardly extending lugs of which the mudguard is attached, a carrier member arranged over the rear portion of the mudguard, connected at its rear end to the rear end of the mudguard and having downwardly extending projections at its front end, arranged in the sockets of said socketed lugs, attached at its front end to said supporting members, said carrier member having downwardly converging stays having attaching members at their lower ends, said attaching members being detachably secured to said bearing members.

In witness whereof I have hereunto set my hand.

ROBERT WALKER SMITH.